United States Patent
Truelle et al.

(10) Patent No.: US 10,328,485 B2
(45) Date of Patent: Jun. 25, 2019

(54) METHOD FOR PRODUCING A CERAMIC CORE

(71) Applicant: SAFRAN AIRCRAFT ENGINES, Paris (FR)

(72) Inventors: Franck Edmond Maurice Truelle, Moissy-cramayel (FR); Claude Baldassari, Moissy-cramayel (FR); David Locatelli, Eysines (FR); Daniel Quach, Moissy-cramayel (FR); Jean-Louis Martial Verger, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 223 days.

(21) Appl. No.: 15/508,726

(22) PCT Filed: Sep. 1, 2015

(86) PCT No.: PCT/FR2015/052305
§ 371 (c)(1),
(2) Date: Mar. 3, 2017

(87) PCT Pub. No.: WO2016/034802
PCT Pub. Date: Mar. 10, 2016

(65) Prior Publication Data
US 2017/0274445 A1 Sep. 28, 2017

(30) Foreign Application Priority Data
Sep. 4, 2014 (FR) ...................... 14 58298

(51) Int. Cl.
*B22C 9/10* (2006.01)
*B29C 33/42* (2006.01)
(Continued)

(52) U.S. Cl.
CPC ............ *B22C 9/10* (2013.01); *B29C 33/42* (2013.01); *B29C 33/76* (2013.01); *B22C 9/04* (2013.01); *F05D 2230/21* (2013.01)

(58) Field of Classification Search
CPC .... B22C 9/00; B22C 9/04; B22C 9/10; B22C 9/18
See application file for complete search history.

(56) References Cited

FOREIGN PATENT DOCUMENTS

| CN | 1628922 A | 6/2005 |
|----|-----------|--------|
| CN | 1830598 A | 9/2006 |

(Continued)

OTHER PUBLICATIONS

International Search Report in corresponding International Application No. PCT/FR2015/052305 dated Dec. 10, 2015 (4 pages—English translation included).

*Primary Examiner* — Kevin P Kerns
*Assistant Examiner* — Steven S Ha
(74) *Attorney, Agent, or Firm* — Bookoff McAndrews, PLLC

(57) ABSTRACT

The invention relates to the field of casting, and more particularly to a method of producing a ceramic core (1) for casting, said core (1) presenting a shape that includes at least a first lateral protuberance (11), and the method comprising at least a step of injecting a paste comprising a ceramic granulate and a polymer binder into a mold cavity In order to form a part (10) presenting a shape corresponding to the shape of the core (1) together with at least one additional lateral protuberance (15) adjacent to said first lateral protuberance (11), a step of firing the part (10), and a step of eliminating said additional lateral protuberance (15) from the part (10) after said firing step.

11 Claims, 1 Drawing Sheet

(51) Int. Cl.
*B29C 33/76* (2006.01)
*B22C 9/04* (2006.01)

(56) References Cited

FOREIGN PATENT DOCUMENTS

| | | |
|---|---|---|
| CN | 102099135 A | 6/2011 |
| EP | 1041246 A1 | 10/2000 |
| EP | 1201879 A2 | 5/2002 |
| EP | 1 942 251 A2 | 7/2008 |
| FR | 2986982 A1 | 8/2013 |

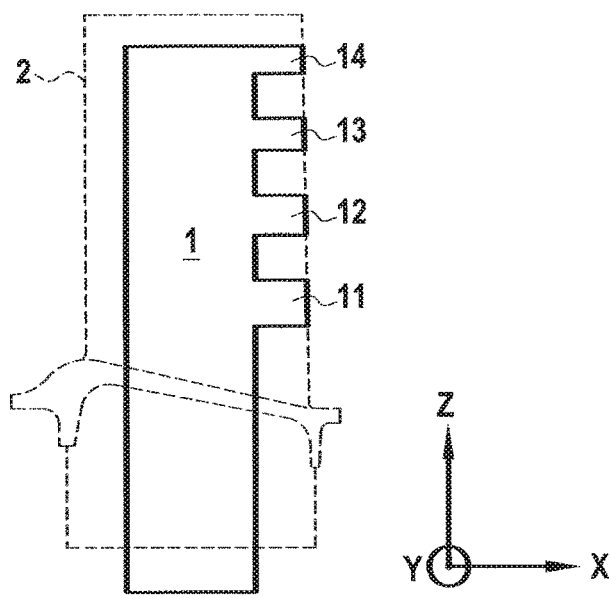
FIG.1
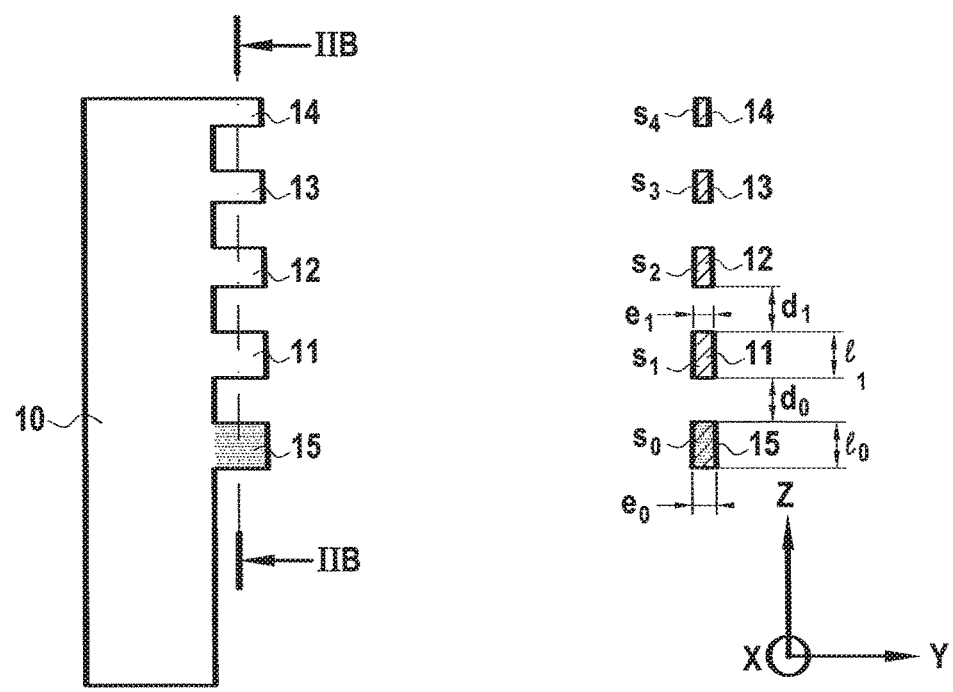
FIG.2A
FIG.2B

METHOD FOR PRODUCING A CERAMIC CORE

CROSS-REFERENCE TO RELATED APPLICATIONS

This application is the U.S. national phase entry under 35 U.S.C. § 371 of International Application No. PCT/FR2015/052305, filed on Sep. 1, 2015, which claims priority to French Patent Application No. 1458298, filed on Sep. 4, 2014, the entireties of which are herein incorporated by reference.

BACKGROUND OF THE INVENTION

The present invention relates to the field of casting, and more particularly to producing ceramic cores for casting, which cores are to be received in casting molds for forming internal cavities in castings made in such molds.

Such cores may be used in particular in lost model or lost wax casting methods. So-called "lost model" or "lost wax" casting methods have been known since antiquity. They are particularly adapted to producing metal parts of complex shapes. Thus, lost wax casting is used in particular for producing turbomachine blades. In the present context, the term "turbomachine" is used to designate any machine in which it is possible to transfer energy between a flow of fluid and at least one rotor, such as for example a compressor, a pump, a turbine, a propeller, or a combination of a plurality of such elements. The term "blade" is used to cover any airfoil element, whether stationary or rotary, that contributes to this transfer of energy in the turbomachine. Lost wax casting is particularly useful for production.

In lost wax casting, the first step is normally to make a model out of a meltable material, having a melting temperature that is comparatively low, such as for example wax or resin. The model is then integrated with a casting tree that is to be covered in refractory material in order to form a mold. After the meltable material of the mold has been removed or eliminated from the inside of the mold, whence the term "lost" in the name for such methods, molten metal is cast into the mold in order to fill the cavity in the mold that is formed by the model being removed or eliminated from the mold. Once the metal cools and solidifies, the mold can be opened or destroyed in order to recover a metal part having the shape of the model. The term "metal" is used in the present context to cover not only pure metals, but above all metal alloys.

In order of form complex internal cavities within metal parts that are obtained by such casting methods, it is possible to integrate one or more refractory cores in each model. These refractory cores remain in position inside each mold after the meltable material has been removed, thereby enabling complex shapes to be formed inside the casting that is made in the mold. They can subsequently be eliminated together with the rest of the mold when unmolding the part.

Typically, such refractory cores are made of ceramic material and constitute consumables in the casting method. To produce them, injection-molding methods have been developed in which a paste comprising a ceramic granulate and a polymer binder is injected under pressure into a mold cavity in order to form the core, with the core then being, fired in order to consolidate it. In order to further increase the ability of the core to withstand the forces to which it is to be subjected during the casting process, the core may also be impregnated with a resin after its initial firing, prior to being, fired again a second time.

Nevertheless, the reject rate when producing such cores can be relatively high, particularly when they are complex in shape. This is due to internal stresses that are generated during the firing and subsequent cooling of the core, which internal stresses can give rise to cracking in certain critical points of the core. In particular, the core may present lateral protuberances, especially when it is to form a cooling circuit in a turbomachine blade, which lateral protuberances may then be intended to form outlet channels leading to an outside surface of the blade, and in particular outlet slots in the trailing edge of the blade. Under such circumstances, cracks can form at the root of at least one of the lateral protuberances.

OBJECT AND SUMMARY OF THE INVENTION

The invention seeks to remedy those drawbacks. In particular, the present disclosure seeks to propose a method of producing a ceramic core for casting that makes it possible to avoid forming cracks at the root of at least one first lateral protuberance of the core.

In at least one embodiment of the invention, this object is achieved by the fact that the method comprises at least a step of injecting a paste comprising a ceramic granulate and a polymer binder into a mold cavity in order to form a part presenting a shape corresponding to the shape of the core together with at least one additional lateral protuberance adjacent to said first lateral protuberance, a step of firing the part, and a step of eliminating said additional lateral protuberance from the part after said, firing step.

By means of these provisions, the internal stresses tending to generate cracks during firing can be concentrated on the additional lateral protuberance of the part, which additional lateral protuberance can then perform a sacrificial role, since it is subsequently eliminated and is no longer to be found on the finished ceramic core. The first lateral protuberance of the core, together with any other adjacent lateral protuberances can then be spared from such cracks being formed, thereby reducing the reject rate.

In order to better consolidate the part, the method may also include a step of impregnating the part with a resin after said firing step. This impregnation step may take place before or after eliminating the additional lateral protuberance.

In order to better concentrate internal stresses of the part on the additional lateral protuberance, the additional lateral protuberance may have a cross-section presenting an area corresponding to 75% to 125% of the area of a cross-section of the first lateral protuberance in the same section plane. In particular, the additional lateral protuberance may have a thickness parallel to a transverse axis of the part corresponding to 90% to 110% of the thickness of the first lateral protuberance parallel to the same transverse axis, and/or a width parallel to a longitudinal axis of the part corresponding to 90% to 110% of the width of the first lateral protuberance parallel to the same longitudinal axis.

The shape of the core may present not only a first lateral protuberance, but also a plurality of lateral protuberances spaced apart from one another parallel to a longitudinal axis of the part, in particular with cross-sections that decrease going away from the first lateral protuberance. The additional lateral protuberance of the part may be spaced apart from said first lateral protuberance along the same axis and in the opposite direction to the other lateral protuberances of said plurality of lateral protuberances. Under such circumstances, and in order to better concentrate internal stresses on the additional lateral protuberance, a minimum distance between the additional lateral protuberance of the part and the first lateral protuberance may be 0.7 times to 2.5 times, and in particular 1 to 1.5 times, a minimum distance between the first lateral protuberance and the closest of the lateral protuberances of said plurality of lateral protuberances.

In particular, the core may be for being received in a casting, mold for producing a turbomachine blade in order to form a cooling circuit in the blade, said first lateral protuberance forming an outlet slot in the trailing edge.

BRIEF DESCRIPTION OF THE DRAWING

The invention can be well understood and its advantages appear better on reading the following detailed description of an embodiment given by way of non-limiting example. The description refers to the accompanying drawing, in which:

FIG. 1 is a view of a ceramic core produced by the method of the invention;

FIG. 2A is a side view of a part that is to form the core, prior to eliminating an additional lateral protuberance; and FIG. 2B is a view of the same part in section on plane IIB-IIB.

DETAILED DESCRIPTION OF THE INVENTION

FIG. 1 shows a ceramic core 1 made using a method constituting a specific embodiment of the invention. The ceramic core 1 is for use in producing a turbomachine blade 2 (drawn in dashed lines) by lost wax casting. As can be seen in figure, the core 1 presents four lateral protuberances 11, 12, 13, and 14 oriented parallel to a transverse axis X of the core 1, and offset from one another parallel to a longitudinal axis Z of the core 1. These four lateral protuberances 11, 12, 13, and 14 are in the form of teeth and are for forming trailing edge outlet slots in the blade 2 for a cooling circuit of the blade 2.

In a first step of producing the core 1, a paste comprising a ceramic granulate, e.g. constituted by silica grains of micrometer size, and a polymer binder serving to give the paste a desired degree of viscosity, is injected at high pressure, e.g. lying in the range 5 megapascals (MPa) to 70 MPa, into a mold cavity presenting a shape corresponding to the shape of the core 1, but together with an additional lateral protuberance. This produces an intermediate part that is consolidated by sintering the ceramic granulate during a firing step. By way of example, the firing step may have a total duration lying in the range 30 hours (h) to 45 h, with one plateau at 80° C. and another plateau at 1200° C. so as to ensure not only that the ceramic granulate is sintered, but also that the polymer binder is eliminated.

The intermediate part 10 as consolidated in this way is shown in FIGS. 2A and 2B. As can be seen in FIG. 2A, the intermediate part 10 that is to form the core 1 has at least one additional lateral protuberance 15 adapted to be eliminated after firing the intermediate part 10 and prior to using the core 1. Thus, in the embodiment shown, in addition to the four lateral protuberances 11, 12, 13, and 14 of the core 1, the intermediate part presents an additional lateral protuberance 15 adjacent to the first lateral protuberance 11, which in the embodiment shown is that one of the four lateral protuberances 11, 12, 13, and. 14 that is the closest to the root of the blade 2. More specifically, the additional lateral protuberance 15 is spaced apart from the first lateral protuberance 11 going away from the other lateral protuberances 12, 13, and 14. On the part 10, the minimum distance $d_0$ between the additional lateral protuberance 15 and the first lateral protuberance 11 in a direction parallel to the longitudinal axis Z lies in the range 0.7 times to 2.5 times the minimum distance $d_1$ between the first lateral protuberance 11 and the following lateral protuberance 12. In particular, the distance $d_0$ may lie in the range 1 to 1.5 times the distance $d_1$.

FIG. 2B shows the cross-sections of the lateral protuberances 15, 11, 12, 13, and 14 in the section plane IIB-IIB of FIG. 2A. As shown diagrammatically in this figure, the area $s_0$ of the cross-section of the additional lateral protuberance 15 is similar to the area $s_1$ of the cross-section of the first lateral protuberance 11. In particular, the area $s_0$ may lie in the range 75% to 125% of the area $s_1$. Specifically, the two areas $s_0$, and $s_1$ may be substantially equal. The areas $s_2$, $s_3$, and $s_4$ of the cross-sections of the other lateral protuberances 12, 13, and 14 may decrease going from the area $s_1$ of the cross-section of the first lateral protuberance 11, in such a manner that $s_1 > s_2 > s_3 > s_4$, or at least all of them are less than the areas $s_0$ and $s_4$.

In the embodiment shown, each of the lateral protuberances 15, 11, 12, 13, and 14 presents a section that is substantially rectangular. The width $l_0$ and the thickness $e_0$ of the additional lateral protuberance 15 in directions that are parallel respectively to the longitudinal axis and to a second transverse axis Y perpendicular to the first transverse axis X, may each present a value lying in the range 90% to 110% of the corresponding dimensions $l_1$ and $e_1$ of the first lateral protuberance 11.

As a result of the part 10 being fired and sintered, it shrinks, thereby generating internal stresses in the part 10. These internal stresses can produce cracks at the root of the additional lateral protuberance 15, which thus plays a sacrificial in order to avoid cracks forming in the first lateral protuberance 11 or in the subsequent lateral protuberances 12, 13, and 14. Nevertheless, in a subsequent step, the additional lateral protuberance 15 is eliminated, e.g. by machining, so as to give the part 10 the final shape for the core 1. The cracks are thus eliminated together with the additional lateral protuberance 15.

In another step, that may be performed before, or preferably after, eliminating the additional lateral protuberance 15, it is possible to impregnate the part 10 with a thermosetting resin in order to give it even better mechanical properties.

After these steps, starting from the paste of ceramic granulate and polymer binder, and going via the part 10 with an additional lateral protuberance, the ceramic core 1 is thus obtained in its final shape.

The resulting core 1 can then be incorporated in a casting mold in order to form complex internal outlines in a casting made in the mold.

Thus, in a lost wax casting method, the core 1 as obtained in this way can be incorporated in a model of the metal part that is to be made, which model is made using a material that melts at a melting temperature that is comparatively low. Such a material may be a wax or a resin, for example. The model can then be integrated in a casting tree designed to be coated in refractory material in order to form a casting mold. After removing or eliminating the meltable material of the model from the inside of the casting mold, molten metal is cast into the mold so as to fill the molding cavity that is formed by the model in the casting mold after the model has been removed or eliminated. Once the metal cools and solidifies, the mold is opened or destroyed in order to recover a metal part having the shape of the model.

Although the present invention is described with reference to a specific embodiment, it is clear that various modifications and changes may be applied thereto without going beyond the general ambit of the invention as defined by the claims. Consequently, the description and the drawings should be considered in a sense that is illustrative rather than restrictive.

We claim:

1. A method of producing a ceramic core for casting, said core presenting a shape that includes at least a first lateral protuberance, and the method comprising at least:
    a step of injecting a paste comprising a ceramic granulate and a polymer binder into a mold cavity in order to form a part presenting a shape corresponding to the shape of the core together with at least one additional lateral protuberance adjacent to the first lateral protuberance;
    a step of firing the part; and
    a step of eliminating the at least one additional lateral protuberance from the part after said firing step.

2. The method according to claim 1, wherein the method also includes a step of impregnating the part with a resin after the firing step.

3. The method according to claim 1, wherein the at least one additional lateral protuberance is eliminated by machining.

4. The method according to claim 1, wherein the at least one additional lateral protuberance has a cross-section presenting an area corresponding to 75% to 125% of an area of a cross-section of the first lateral protuberance in a same section plane.

5. The method according to claim 1, wherein the at least one additional lateral protuberance has a thickness parallel to a transverse axis of the part corresponding to 90% to 110% of a thickness of the first lateral protuberance parallel to the same transverse axis.

6. The method according to claim 1, wherein the at least one additional lateral protuberance has a width parallel to a longitudinal axis of the part corresponding to 90% to 110% of a width of the first lateral protuberance parallel to the same longitudinal axis.

7. The method according to claim 1, wherein the shape of the core presents a plurality of lateral protuberances, including the first lateral protuberance and at least one other lateral protuberance, spaced apart from one another parallel to a longitudinal axis of the part.

8. The method according to claim 7, wherein the lateral protuberances of the plurality of lateral protuberances present cross-sections that decrease going away from the first lateral protuberance.

9. The method according to claim 7, wherein the at least one additional lateral protuberance of the part is spaced apart from said first lateral protuberance along the longitudinal axis and in an opposite direction to the at least one other lateral protuberance of the plurality of lateral protuberances.

10. The method according to claim 9, wherein a minimum distance between the at least one additional lateral protuberance of the part and the first lateral protuberance is 0.7 times to 2.5 times a minimum distance between the first lateral protuberance and a closest other lateral protuberance of the at least one other lateral protuberance of the plurality of lateral protuberances.

11. The method according to claim 1, wherein the core is for being configured to be received in a casting mold for producing a turbomachine blade in order to form a cooling circuit in the blade, the first lateral protuberance forming an outlet slot in a trailing edge of the blade.

* * * * *